Aug. 6, 1957  J. F. ROACH  2,802,177
METHOD OF AND APPARATUS FOR MEASURING PEAK INVERSE VOLTAGE
Filed June 5, 1953

INVENTOR.
JACK F. ROACH,
BY Nicholas T Vohr
HIS ATTORNEY.

United States Patent Office 2,802,177
Patented Aug. 6, 1957

2,802,177

METHOD OF AND APPARATUS FOR MEASURING PEAK INVERSE VOLTAGE

Jack F. Roach, Van Nuys, Calif., assignor, by mesne assignments, to Hughes Aircraft Company, a corporation of Delaware Application June 5, 1953, Serial No. 359,918

4 Claims. (Cl. 324—57)

This invention relates to test equipment, and, more particularly, to a method of and apparatus for automatically measuring a peak voltage of a negative resistance device under reproducible temperature conditions.

There are many instances when it becomes necessary to determine the maximum breakdown voltage of an impedance device. For example, after semiconductor devices leave production lines, it is advantageous to separate the produced devices into a number of classes in accordance with their peak inverse voltage characteristics.

Measurement of breakdown voltage without destruction of or damage to the device under test requires that the current be shut off immediately when the breakdown voltage is attained, and hence is an inherently difficult process. Further difficulties appear if the application of the test voltage affects the temperature of the device, thus varying its breakdown voltage.

For the purpose of illustration, the invention will be described in connection with the measurement of the peak inverse voltage of semiconductor diodes, such as germanium diodes, where it is desired to produce devices having as high peak inverse voltage characteristics as possible. Diodes of the above type, after they leave the production line, are tested by means of the automatic peak inverse voltage tester disclosed here, which automatically and accurately gives an indication of the peak inverse voltage characteristic of the diode under test. Since the specific resistance of germanium is a function of temperature, in order to obtain peak inverse voltage tests on a consistent basis, it is necessary to increase the voltage applied across the germanium diode at a rate which is constant and which is reproducible from one test to the next. The disclosed tester generates a reproducible voltage wave which has the form of a saw-tooth wave, with the linear portion of the saw-tooth wave determining the rate of the increase in voltage. When the peak inverse voltage is attained and there is a sudden change in the resistance of the diode, the tester automatically shuts off the voltage generator in order to prevent damage to the diode, and at the very same time gives either visual or recorded information of the maximum voltage peak which has been attained in the course of testing the individual diode.

It is therefore an object of this invention to provide test instruments capable of indicating or recording a maximum voltage at which an impedance device under test undergoes a breakdown or a sudden impedance change, the disclosed instruments being capable of furnishing reproducible results in a series of tests, such as those desired on production lines.

It is an additional object of this invention to provide automatic peak inverse voltage testers for determining the zener voltage in semiconductor devices, such as diodes utilizing semiconductors, without exceeding said voltage as said voltage is approached, thus automatically terminating all current flow at the zener voltage for preventing permanent damage, due to excess current, to the devices under test.

It is also an object of the invention to provide a novel and automatic means for and method of measuring a point where an impedance undergoes a sudden impedance change, or for measuring the peak inverse voltage of a device.

The novel features which are believed to be characteristic of the invention, both as to its organization and method of operation, together with further objects and advantages thereof, will be better understood from the following description considered in connection with the accompanying drawings in which several embodiments of the invention are illustrated by way of examples. It is to be expressly understood, however, that the drawings are for the purpose of illustration and description only and are not intended as a definition of the limits of the invention.

Referring now to the drawings.

Figure 1:
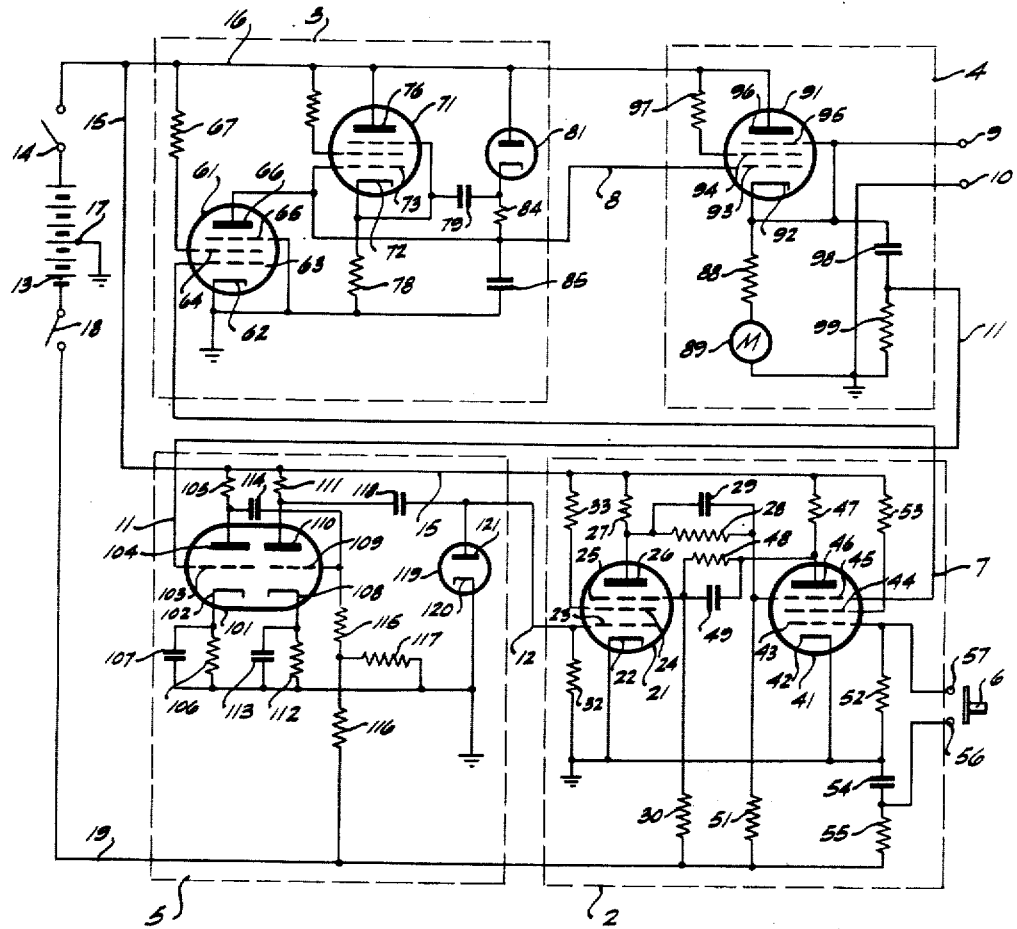
Fig. 1 is a schematic diagram of a circuit embodying the invention.

Referring now to Fig. 1, the circuit comprises four main components. A multivibrator 2 which is used for starting the functioning of the circuit is also used as an automatic switch for instantaneously stopping the rise of the saw-tooth voltage wave when a sudden change in the impedance of the device under test takes place. Accordingly, the multivibrator is connected through a conductor 7 to a saw-tooth generator 3, which also includes a "bootstrap" circuit for improving the linearity of the saw-tooth wave. The saw-tooth generator is connected through a conductor 8 to an indicator circuit 4, where the linear saw-tooth voltage wave is utilized for testing any desired device. A signal voltage appearing in the indicator circuit is impressed through a conductor 11 on an amplifier 5, the output of which is connected through a conductor 12 to the multivibrator 2. When a sudden change in the impedance of the device under test takes place, a negative signal is impressed on one of the control grids of the multivibrator, with the result that the multivibrator is flipped over to that state of conductivity which produces immediate termination of the voltage saw-tooth wave with the concomitant termination of the test.

When a device o be tested has been connected to the terminals 9 and 10 in the indicator circuit, the multivibrator is actuated by closing the push-button switch 6 upon the terminals 56 and 57. This causes pentode 41 in the multivibrator and pentode 61 in the saw-tooth generator to become nonconductive, thus initiating the generation of a saw-tooth voltage wave, as will be explained later. A linear saw-tooth wave generated by the saw-tooth generator, including the "bootstrap" circuit 71—79, is applied in the indicator circuit across the terminals 9 and 10 and hence to the device under test. At the point of time when a sudden change in the impedance of the device under test occurs, a negative pulse formed in the indicator circuit after being amplified by the amplifier 5 is delivered to the multivibrator for changing its state of conductivity, the latter in turn terminating the entire test cycle by quickly discharging the condenser 85 of the saw-tooth wave generator, thus at once terminating the rise in the potential applied to the indicator circuit.

Preliminary to a detailed description of the operative circuit the power supply system will be briefly mentioned. A source 13 having a grounded tap 17 supplies positive potential through a switch 14 to the conductors 15 and 16, while negative potential is supplied through a switch 18 to a conductor 19.

Turning now to the multivibrator circuit, it includes pentodes 21 and 41 representing a bistable circuit in which when pentode 21 is conductive pentode 41 is nonconductive and vice versa. Pentodes are used in the multivibrator for facilitating the control of its states of conductivity by means of control grids 23 and 43, grid 43 being connected to the terminal 57 associated with pushbutton switch 6 while the other associated terminal 56 is connected to a starting circuit consisting of a grounded capacitor 54 connected through its charging resistor 55 to the negative terminal of source 13. Since the cathode 42 of the pentode 41 is grounded and since grid 43 is also grounded through its grid-leak resistor 52, it follows that when switch 6 is closed upon terminals 56 and 57, the condensor 54 which was previously charged to the full potential of the negative portion of the source 13 immediately discharges through grid-leak resistor 52, producing a negative signal on grid 43. This renders pentode 41 nonconductive, thus insuring the proper starting of the test cycle, as will be described later in the specification.

The remaining connections of the multivibrator will be mentioned here only briefly. The circuit is substantially symmetrical, the plate 26 of tube 21 being connected through its plate load resistor 27 to the source 13, while the plate 46 of tube 41 is connected to the source 13 through its plate load resistor 47. Positive bias for screen grids 24 and 44 is supplied from source 13 through their respective dropping resistors 33 and 53. Cathodes 22 and 42 are grounded, and the control grids 23 and 43 being connected to ground through their respective grid-leak resistors 32 and 52 are biased at ground potential. Negative bias for control electrode 25 is provided by means of a voltage divider comprising the resistor 30 connected between the negative terminal of source 13 and electrode 25, resistor 48 connected between electrode 25 and the plate 46, and plate load resistor 47. Capacitor 49 is connected in parallel with resistor 48. A negative bias for control electrode 45 is supplied through a similar voltage divider comprising the resistors 51, 28, and 27, capacitor 29 being connected in parallel with resistor 28. These voltage dividers with their associated capacitors also constitute the switching circuits for changing the multivibrator from one of its modes of operation to the other.

In the first mode of operation tube 21 is fully conductive and tube 41 is nonconductive, while in the second mode the reverse is true. Control electrodes 25 and 45 are biased so that one is a few volts positive in order to permit its tube to conduct, while the other is biased beyond cut-off. In the first mode of operation, the current through plate load resistor 27 includes both the plate current for tube 21 and the current drawn by the voltage divider furnishing bias to the control electrode 45, hence electrode 45 is biased beyond cut-off. In the second mode of operation, plate current flowing through resistor 47 in like manner causes control electrode 25 to be biased beyond cut-off, rendering tube 21 nonconductive. With either tube fully conductive the other tube is nonconductive and the operation of the circuit is, in the absence of a signal on control grid 23 or control grid 43, stable.

A negative voltage signal impressed upon the control grid 23 will cut off the current in tube 21, changing the multi-vibrator from its first mode of operation to its second, and a similar signal impressed on control grid 43 will effect a change in the reverse direction. Such a signal need not have sufficient amplitude to cut off the current through the tube to which it is applied, as a substantial reduction in current will change the bias on the control electrode of the other tube sufficiently to permit conduction, upsetting the circuit balance and changing the mode of operation. The conductor 7 connecting control electrode 45 with control grid 63 of tube 61 provides for the control of the saw-tooth wave generator by the multivibrator in that the state of conductivity of tube 61 thus coincides with that of tube 41.

The saw-tooth voltage generator includes a saw-tooth generating capacitor 85 connected in series with resistor 84, diode 81, conductor 16, switch 14, source of potential 13 and ground tap 17, the latter completing the series circuit since the lower plate of capacitor 85 is also grounded.

Accordingly when condenser 85 is in a fully discharged condition it will charge through resistor 84 and diode 81 to a potential equal to that of the source. In order to repeat the charging and discharging cycles, the upper plate of condenser 85 is connected to plate 66 of pentode 61 whose cathode 62 is grounded. Therefore, whenever pentode 61 is made conductive condenser 85 discharges quickly through that relatively low impedance. It is to be remembered from the previous description of the connections and functioning of the multivibrator that the normal functional cycle of the test circuit always begins with the multivibrator tube 41 becoming nonconductive. Pentode 61 becomes nonconductive at the same time, and as long as it remains nonconductive condenser 85 will charge through resistor 84 from source 13 and from the "bootstrap" circuit. Pentode 61 in conventional fashion has its suppressor grid 65 tied to the cathode and its screen grid 64 positively biased through resistor 67.

It is well known in the art of saw-tooth generators that the generators of the type including only condenser 85, resistor 84 and diode 81 would not produce a linear saw-tooth wave and one method for obtaining a linear saw-tooth wave is to supplement the saw-tooth wave generators of the above type with the "bootstrap" circuit which introduces a corrective voltage component into the voltage used for charging condenser 85. This is accomplished by connecting the upper plate of capacitor 85 to the control grid 73 of a cathode follower tube 71, whose plate 76 is connected to the positive terminal of source 13 and whose cathode 72 is grounded through cathode resistor 78. A large condenser 79 is connected from the cathode 72 to the positive end of resistor 84 and it is this large condenser that introduces the corrective voltage component for making the saw-tooth wave linear. For a more detailed description of the functioning of the bootstrap circuits of the above type, reference is made to "Electronics," by Elmore and Sands, National Nuclear Energy Series, Manhattan Project Technical Section, Div. V, vol. 1, McGraw-Hill Book Co., Inc., 1949, at pages 73 and 115.

The linear saw-tooth voltage wave appears on conductor 8 connected to the upper plate of condenser 85, conductor 8 being rendered more positive as the saw-tooth wave rises. This positive potential is directly impressed on grid 93 of a pentode 91 in the indicator circuit. Since plate 96 of this pentode is directly connected to the positive terminal of source 13 and its cathode 92 is grounded through a resistor 88 and a meter 89, it follows that the conductivity of pentode 91 is a direct function of the potential impressed on grid 93 so long as pentode 91 is operated on the linear portion of its characteristic, which is the case here. The pentode 91 therefore operates as a cathode follower. Screen grid 94 is connected to the positive terminal of source 13 through resistor 97 while the suppressor grid 95 is connected to the cathode. From the above description it follows that a strictly linear saw-tooth voltage wave appears across meter 89 and its series multiplier resistor 88, and therefore the device under test should be connected across these elements for which purpose test terminal 9 connected to cathode 92 and test terminal 10 connected to ground are provided.

It now only becomes necessary to describe that part of the circuit which is instrumental in stopping the rise of voltage across the terminals 9 and 10 when there is a sudden change in the impedance of the device under test. Connected in parallel with the meter 89 and with the device under test is a differentiator circuit comprising the capacitor 98, one plate of which is connected to cathode 92, and the resistor 99, one end of which is grounded. The other plate of capacitor 98 and the other end of resistor 99 are connected to a conductor 11, which represents the output of the indicator circuit and which is connected to grid 103 in the amplifier. Resistance 99 may therefore be considered as a grid-leak resistor in the input circuit of the amplifier while capacitor 98 may be considered as a coupling between the indicator circuit and the control grid of the first amplifier stage.

When a saw-tooth voltage wave is generated, it appears across the above-described parallel combination which comprises the load for the cathode follower tube 91. When the device being tested undergoes a sudden impedance change or its peak inverse voltage is approached or reached, a negative voltage pulse is generated in the differentiator circuit. This negative voltage pulse is amplified and transmitted to the multivibrator for the purpose of shutting off the saw-tooth wave generator.

Prior to turning on the saw-tooth generator the voltage across the parallel combination of the device to be tested, the voltmeter 89, and the differentiator circuit is equal to the quiescent voltage drop across tube 61, of the order of 15 volts. The voltmeter 89 represents an entirely resistive impedance of the order of 5 magohms, and hence draws a very small current. The device to be tested draws a small current, while in the differentiator circuit the capacitor 98 is charged up to the applied voltage and as no current flows through resistor 99 the grid 103 is biased at ground potential.

The turning on of the saw-tooth generator causes the potential at terminal 9 to rise linearly. The current drawn by the differentiator circuit after experiencing an initial transient assumes a constant value which reflects the rate of increase of the applied voltage, and the charge on capacitor 98 increases linearly while the output signal appearing across resistor 99 is a small fixed positive voltage. This output signal establishes the reference or bias potential for grid 103 in the first amplifier stage. When the device being tested approaches or reaches a peak inverse voltage or when it undergoes a sudden change in its impedance, its dynamic impedance decreasing, it draws a current which is disproportionate with respect to the applied voltage. Due to the fact that the output impedance of the circuit of pentode 91 is finite, this disproportionate current causes the voltage wave appearing at terminal 9 to be depressed below a true saw-tooth waveform, decreasing the current through the differentiator circuit and impressing a negative voltage pulse upon the amplifier.

In order to amplify negative input pulses the first stage in the amplifier circuit is self-biased for Class A operation, cathode 102 of the dual triode 101 being grounded through resistor 106 and through capacitor 107 while the plate 104 is connected to the positive terminal of source 13 through plate resistor 105. Capacitor 114, connected between plate 104 and grid 109, couples the signal to the second stage.

Only positive input pulses need pass through the second amplifier stage, hence a voltage divider comprising resistors 116 and 117, connected between the negative terminal of source 13 and ground, delivers through resistor 115 to the grid 109 a negative bias at the cut-off level. Cathode 108 is grounded through resistor 112 and through capacitor 113 while plate 110 connects through plate resistor 111 to the positive terminal of source 13. Capacitor 118 couples the signal from plate 110 to a conductor 12, representing the amplifier output Upon the commencement of the generation of a sawtooth wave of voltage, the initial transient current in the differentiator circuit generates a positive voltage signal which is applied to the amplifier producing a positive pulse on the conductor 12. In order to eliminate this pulse as well as any other positive transients which may occur, a clamping diode 119 has its plate 121 connected to the conductor 12 while its cathode 120 is grounded.

The functional cycle of the circuit may now be briefly summarized. After the test circuit has been energized by closing the switches 14 and 18, it may be necessary to momentarily short the terminals 9—10 in order to insure that the multivibrator is in its second mode of operation and that the capacitor 85 is being maintained in a discharged condition by conduction through tube 61. After a device to be tested has been connected to the terminals 9—10, switch 6 is closed to put the circut into operation, a negative pulse thus impressed upon control grid 43 flipping the multivibrator over to its first mode of operation. Tube 61 is thereby made nonconductive, and capacitor 85 commences to charge, the output of the saw-tooth generator being impressed through the cathode follower circuit of tube 91 upon the test device, the differentiator circuit, and the indicating meter 89. A positive signal generated by the differentiator circuit upon commencement of the saw-tooth is rejected in the amplifier circuit and hence does not affect the operation of the multivibrator. A sudden change in the impedance of the device under test results in a sudden increase in the current flowing through tube 91, decreasing the slope of the saw-tooth voltage appearing across terminals 9—10 and generating a negative pulse in the differentiator circuit. This negative pulse after being amplified is impressed upon control grid 23, rendering tube 21 in the multivibrator circuit nonconductive and switching the multivibrator back to its second mode of operation thus shutting off the saw-tooth voltage and concluding the test cycle.

It is fitting to mention here at the conclusion of the above description some of the circuit constants which are especially suitable for use in a test circuit when the inverse peak voltage of the order of 80 to 100 volts of devices such as germanium diodes is to be determined. A typical diode to be tested may have an inverse resistance of the order of 0.5 megohm. Utilizing a positive power supply of 450 volts, a value of 0.5 microfarad for capacitor 85, a value of 10 megohms for resistor 84, and a value of 8 microfarads for capacitor 79, will produce a linear saw-tooth voltage rising at approximately 90 volts per second, thus making the duration of the test cycle approximately one second. In order to complete the initial transient current in the differentiator circuit, it is essential that the RC time constant of that circuit should be not greater than one-tenth the period of application of the test voltage, and accordingly the time constant of the differentiator circuit may be chosen as one millisecond, with capacitor 98 having a value of 0.02 microfarad and resistor 99 a value of 50,000 ohms. The purpose of using a large resistor and a small capacitor in the differentiator circuit is to limit the discharge current through the diode or other device being tested.

If an impedance device to be tested exhibits a sudden impedance change or peak inverse voltage at applied potentials of the order of 15 volts or less, a modification of the circuit of Fig. 1 is required. This may be accomplished by applying a negative bias to the cathode 12 of the clamping tube 11. The saw-tooth voltage generated on conductor 8 may then be made to start at ground potential.

Figure 2:
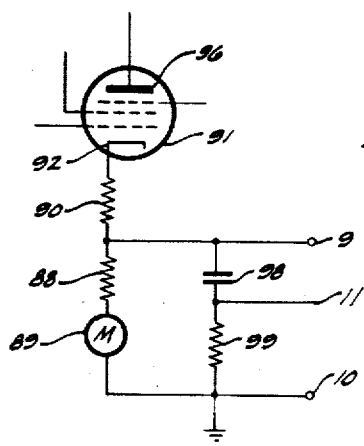
Fig. 2 shows another form of the circuit of Fig. 1.

Fig. 2 shows a modified form of the invention where resistor 90 has been added to the cathode follower circuit of tube 91, being connected between cathode 92 and the parallel combination of the device to be tested, the voltmeter circuit, and the differentiator circuit. Addition of this resistor to the circuit increases the equivalent output impedance of the generator, thus limiting the maximum current which can flow through the device under test.

What is claimed as new is:

1. Electrical apparatus for applying voltage to an impedance device having a negative resistance characteristic, said apparatus comprising: a generator for producing a voltage steadily increasing with respect to time; means for starting said generator; voltage output means including a pair of terminals adapted to receive an impedance device to be tested, a differentiating circuit connected between said terminals; means coupled between said generator and said voltage means for applying only said increasing voltage to said voltage output means to energize said terminals; and stopping means connected to said differentiating circuit and coupled to said generator for stopping said generator when the voltage appearing across said test terminals begins to decrease.

2. Electrical apparatus for applying voltage to an impedance device having a negative resistance characteristic, said apparatus comprising: a generator for producing a voltage increasing linearly with time; voltage output means connected to said generator for receiving said increasing voltage, said voltage output means including two terminals adapted to be connected to the impedance device, a differentiating circuit connected between said terminals, and means for turning on said generator; and stopping means coupled to said differentiating circuit and to said generator for automatically turning off said generator in response to a reversal of the rate of change of the voltage appearing across said terminals.

3. Test apparatus for determining according to reproducible temperature conditions the peak inverse voltage of a crystal rectifier, said apparatus comprising: a linear sawtooth voltage wave generator; a multivibrator having first and second stable states and connected to said generator, said multivibrator being adapted to turn said generator on in response to said multivibrator being triggered into said first state, or off in response to said multivibrator being triggered into said second state; manual control means connected to said multivibrator for triggering said multivibrator to said first state; an indicator circuit for receiving said sawtooth voltage wave, said indicator circuit including a cathode follower having a control grid connected to said generator and a cathode, an output circuit connected to said cathode and including the parallel combination of a voltage measuring device and a differentiating circuit and a pair of terminals for connecting a crystal to be tested, said terminals being connected across said differentiating circuit; means connected to said differentiating circuit for producing a control signal when the polarity of the rate of change of the voltage appearing across said terminals reverses, said means being connected to said multivibrator for triggering said multivibrator into said second state in response to said control signal.

4. An electrical apparatus for measuring the peak inverse voltage of a crystal diode in accordance with reproducible temperature conditions, by applying a linear sawtooth voltage wave through a finite resistance to the diode to pass a reverse current therethrough, and stopping the sawtooth wave when the rate of change of the voltage appearing across the diode reverses polarity, said apparatus comprising: a source of a linear sawtooth voltage wave; a pair of terminals for receiving a diode to be tested, a voltage measuring device and a differentiating circuit connected together in parallel between said terminals; buffer means having a finite resistance, said source being coupled to said buffer means, said buffer means being coupled to said pair of terminals for applying a sawtooth voltage wave thereto; manually operable starting means coupled to said source for controlling said source to initiate generation of a sawtooth wave; and stopping means coupled to said differentiating circuit and to said source for shutting off said sawtooth wave source in response to the rate of change of voltage appearing across said test terminals changing polarity.

References Cited in the file of this patent
UNITED STATES PATENTS

| | | |
|---|---|---|
| 2,088,317 | Bachelet | July 27, 1937 |
| 2,524,225 | Hanchett, Jr. | Oct. 3, 1950 |
| 2,590,116 | Moland et al. | Mar. 25, 1952 |
| 2,615,147 | Hoover | Oct. 21, 1952 |
| 2,646,545 | King, Jr. | July 21, 1953 |
| 2,669,004 | Blair | Feb. 16, 1954 |

UNITED STATES PATENT OFFICE

CERTIFICATE OF CORRECTION

Patent No. 2,802,177                   August 6, 1957

Jack F. Roach

It is hereby certified that error appears in the printed specification of the above numbered patent requiring correction and that the said Letters Patent should read as corrected below.

Column 2, line 42, for "device o" read --device to--; column 5, line 17, for "represents" read --presents--; column 7, line 11, strike out "and", first occurrence.

Signed and sealed this 26th day of November 1957.

(SEAL)
Attest:

KARL H. AXLINE                                   ROBERT C. WATSON
Attesting Officer                                 Commissioner of Patents